United States Patent [19]

DelPaggio

[11] E Re. 29,046

[45] Reissued Nov. 23, 1976

BEST AVAILABLE COPY

[54] METHOD AND APPARATUS FOR INDUCTIVELY HEATING VALVE SEATS

[75] Inventor: Anthony F. DelPaggio, Parma, Ohio

[73] Assignee: Park-Ohio Industries, Inc., Cleveland, Ohio

[22] Filed: June 19, 1975

[21] Appl. No.: 588,243

Related U.S. Patent Documents

Reissue of:

[64] Patent No.: 3,743,809
Issued: July 3, 1973
Appl. No.: 151493
Filed: June 9, 1971

[52] U.S. Cl. ..... 219/10.57; 219/10.43; 219/10.71

[51] Int. Cl.[2] ..... H05B 5/00

[58] Field of Search ..... 219/10.57, 10.43, 10.71, 219/10.79; 266/4 EI, 5 EI

[56] References Cited

UNITED STATES PATENTS 2,797,289 6/1957 Georgen ..... 219/10.57

*Primary Examiner*—Bruce A. Reynolds
*Attorney, Agent, or Firm*—Meyer, Tilberry & Body

[57] ABSTRACT

A method and apparatus for simultaneously heating the conical surfaces of first and second valve seats lying generally in a given plane on an engine component, which method and apparatus comprises mounting two inductors for independent reciprocal and lateral movement with respect to a common frame and biased outwardly therefrom, moving the common frame toward the plane of the valve seats until each is stopped by contacting the engine component, locking the two inductors with respect to the common frame, moving the common frame away from the valve seats to provide the necessary coupling gap, and then energizing the inductors to inductively heat the valve seats preparatory to quench hardening thereof.

17 Claims, 14 Drawing Figures

INVENTOR.
ANTHONY F. DEL PAGGIO

BY

*Meyer, Tilberry & Body*
ATTORNEYS

INVENTOR.
ANTHONY F. DEL PAGGIO
BY
Meyer, Tilberry & Body
ATTORNEYS

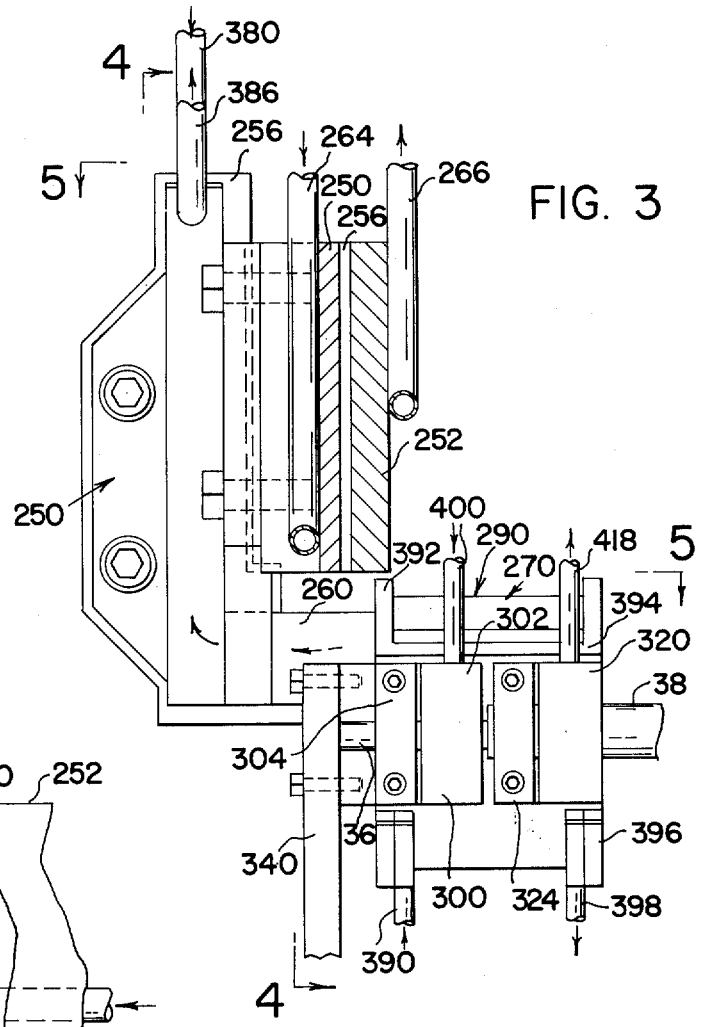
FIG. 3
FIG. 4
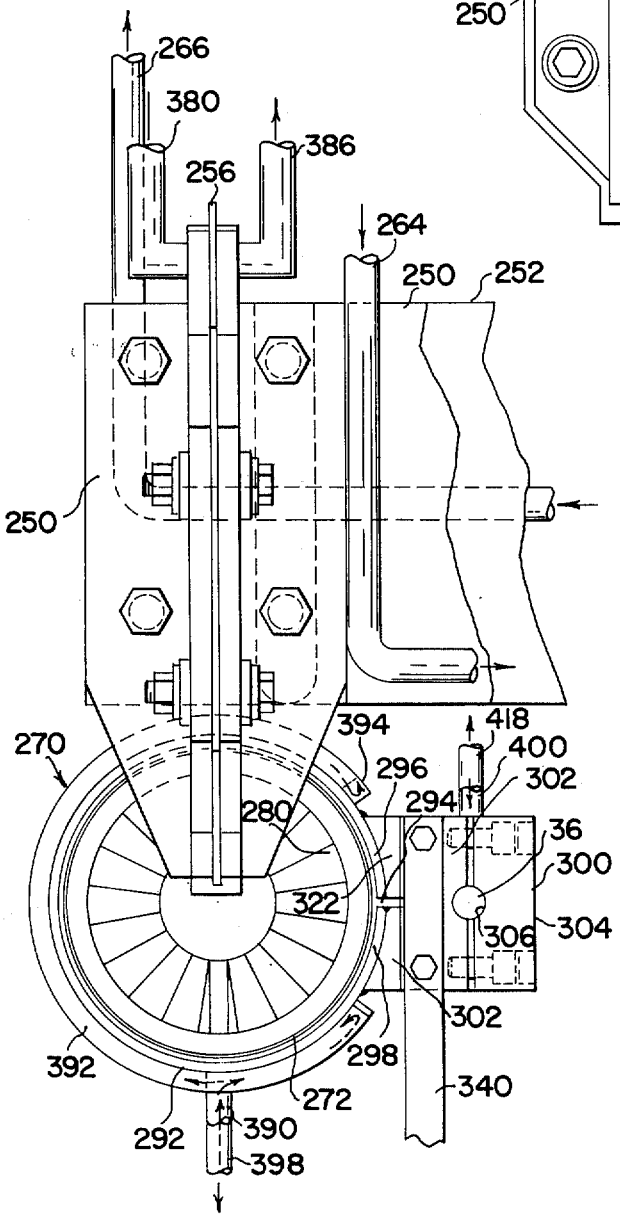
INVENTOR.
ANTHONY F. DEL PAGGIO
BY
Meyer, Tilberry & Body
ATTORNEYS INVENTOR.
ANTHONY F. DEL PAGGIO
BY
Meyer, Tilberry & Body
ATTORNEYS INVENTOR.
ANTHONY F. DEL PAGGIO
BY
Meyer, Tilberry & Body
ATTORNEYS INVENTOR.
ANTHONY F. DEL PAGGI(
BY
Meyer, Tilberry & Body
ATTORNEYS

INVENTOR.
ANTHONY F. DEL PAGGI(

BY

*Meyer, Tilberry & Body*
ATTORNEYS

METHOD AND APPARATUS FOR INDUCTIVELY HEATING VALVE SEATS

Matter enclosed in heavy brackets [ ] appears in the original patent but forms no part of this reissue specification; matter printed in italics indicates the additions made by reissue.

This invention relates to the art of induction heating and more particularly to a method and apparatus for inductively heating the valve seats of an engine component, such as an engine head.

The invention is particularly applicable for simultaneously heating adjacent exhaust valve seats of a gray cast iron engine head, and it will be described with reference thereto; however, it must be appreciated that the invention has broader applications and may be used for heating various types of valve seats in engine heads of various material and for heating similar types of work surfaces.

Internal combustion engines generally employ conical shaped valve seats which coact with reciprocal poppet valves for controlling flow of gases to and from the cylinders. During operation of the engine, the exhaust valves are subjected to extremely high temperatures and thus, experience a substantial amount of wear. This wear was reduced by lubricants contained in gasoline, especially lead and phosphorous added to the gasoline. Recently, gasolines are being used with reduced lead and/or phosphorous content; therefore, the exhaust valve seats are subjected to more rapid deterioration. To counteract this, extensive efforts have been devoted to increasing the physical properties of the exhaust valve seat during manufacturing.

It has been suggested to heat inductively the conical surface of the exhaust valve seats in an internal combustion engine by using a single turn inductor positioned adjacent the valve seat, which inductor inductively heats the valve seat preparatory to quench hardening. This type of heating installation is extremely well adapted for automatic processing of the engine head, since the various exhaust valve seats in an engine head can be inductively heated in a single operation. Consequently, the efforts to improve the physical characteristics of the exhaust valve seats have generally been centered around a gang-type induction heating apparatus. These efforts have heretofore taken various courses. It is necessary to provide accurate and uniform magnetic coupling between the separate inductors and the conical surface of the valve seats. To accomplish this, it has been suggested to bring the various inductors into position with respect to the valve seats and then change the magnetic coupling at each valve seat by a servo controlled magnetically permeable core extending through the inductor. Also, it has been suggested to shift the individual inductors with respect to the valve seats in response to measured magnetic coupling characteristics. All of these efforts have met with limited success.

The present invention relates to a method and apparatus for accurately positioning the inductors with respect to the valve seats so that the induction heating can be uniform without requiring servomechanisms and other individual controls on the separate inductors.

In accordance with the present invention, there is provided an apparatus for positioning first and second generally circular inductors a common, preselected distance from first and second conical surfaces of a body member, which surfaces are to be inductively heated by the inductors. The conical surfaces lie generally in a common plane but may be slightly offset therefrom in a direction perpendicular to the plane. This apparatus comprises first and second carrier means for supporting each of the first and second inductors, means for mounting the first and second carrier means onto a common frame for independent reciprocal movement of the carrier means in a direction generally perpendicular to the plane, means biasing each of the carrier means in a direction toward the plane and with respect to the common frame, means for moving the common frame in a direction generally perpendicular to the plane and toward the frame until after both of the common carrier means have been stopped by the body member and have been moved independently of the carrier frame, means for locking the first and second carrier means onto the common frame, and means for moving the common frame in a direction generally perpendicular to the plane and away from the plane a selected distance corresponding to the preselected distance.

In this manner, the two inductors are biased outwardly from a common frame and the common frame is moved into contact with the body member which may be an internal combustion engine head. This then allows the separate inductors to seek a common position with respect to the valve seats which they are to heat, preferably in contact with the seats. Then all of the inductors are locked to the frame, and the frame is moved backwardly a distance generally corresponding to the desired magnetic coupling distance for the separate inductors. Consequently, no servomechanisms are required, and relatively simple structures are employed to selectively control the spacing of the individual inductors from their valve seats prior to heating.

In accordance with another aspect of the present invention, there is provided a method including the steps of providing at least two single turn inductors having shapes generally matching conical surfaces of the valve seats, mounting both of these inductors for independent reciprocal movement with respect to a common frame, biasing each of the inductors toward the valve seats, moving the common frame toward the valve seats until the engine head stops movement of the individual inductors, then locking the inductors onto the common frame, moving the common frame backwardly a preselected distance, and then energizing the inductors to inductively heat the individual valve seats.

In accordance with another aspect of the present invention there is provided an induction heating device employing a cylindrical secondary winding secured onto a movable inductor and movable therewith and a relatively fixed primary winding concentric with the secondary winding and having means for allowing both axial and radial movement between the primary and secondary windings. By using this concept, slight movement of the inductor, which carries the secondary, can be accommodated in the gap between the primary and secondary windings. Consequently, the primary winding may be fixedly mounted and without requiring flexible leads.

In accordance with another aspect of the present invention there is provided an induction heating device for heating the conical surface of a valve seat of an engine head preparatory to quench hardening wherein the engine head has a structural element fixed with respect to the center of the conical surface. This device comprises a support frame fixed in a direction radial of the conical surface, an inductor having a shape generally matching the conical surface and two input leads for energizing the inductor, a carrier means for supporting the inductor, means for mounting the carrier means onto the support frame, which mounting means includes means for limiting movement of the carrier means to only a direction radial of the conical surface, and means on the carrier and adapted to coact with the structural element of the head for shifting the inductor to a position with the inductor generally concentric with the conical surface.

This particular aspect of the present invention provides a floating locator on the inductor at each heating position. This floating locator is capable of movement only transversely of the valve seat by a support frame which has means for so limiting the movement of the locator. In this manner, if there is a slight misalignment of the inductor as it is moving toward the valve seat, the locator contacts the engine head and shifts the inductor transversely or radially of the valve seat to provide concentricity. This movement is relatively limited and can be accommodated by the previously mentioned relative movement between the secondary of the transformer, which is fixed to the inductor and the primary of the transformer which is in a relatively stationary position.

The primary object of the present invention is the provision of a method and apparatus for inductively heating the conical surface of a valve seat in an internal combustion engine, which method and apparatus is uniform in operation and relatively simple in structure.

Another object of the present invention is the provision of a method and apparatus for inductively heating the conical surface of a valve seat in an internal combustion engine, which method and apparatus provide accurate control of the magnetic coupling between the inductor and the valve seat before the inductor is energized.

Still another object of the present invention is to provide a method and apparatus as defined above which do not employ servomotors or selective controls for adjusting the magnetic coupling between the inductor and the valve seat.

Still another object of the present invention is the provision of a locator device for an inductor to be used to heat inductively the conical surface of a valve seat, which device allows controlled movement of the inductor radial of the valve seat for the purposes of obtaining concentricity.

Another object of the present invention is the provision of a transformer device for use in an induction heating installation wherein an inductor is moved with respect to the valve seat for the purposes of obtaining concentricity, which transformer device employs a movable secondary mounted directly onto the inductor and movable in a radial direction with respect to a generally fixed primary concentric with said secondary.

These and other objects and advantages will become apparent from the following description taken together with the accompanying drawings in which:

FIG. 3 is an enlarged cross-sectional view taken generally along line 3—3 of FIG. 1;

FIG. 4 is an end view taken generally along line 4—4 of FIG. 3;

Figure 1:
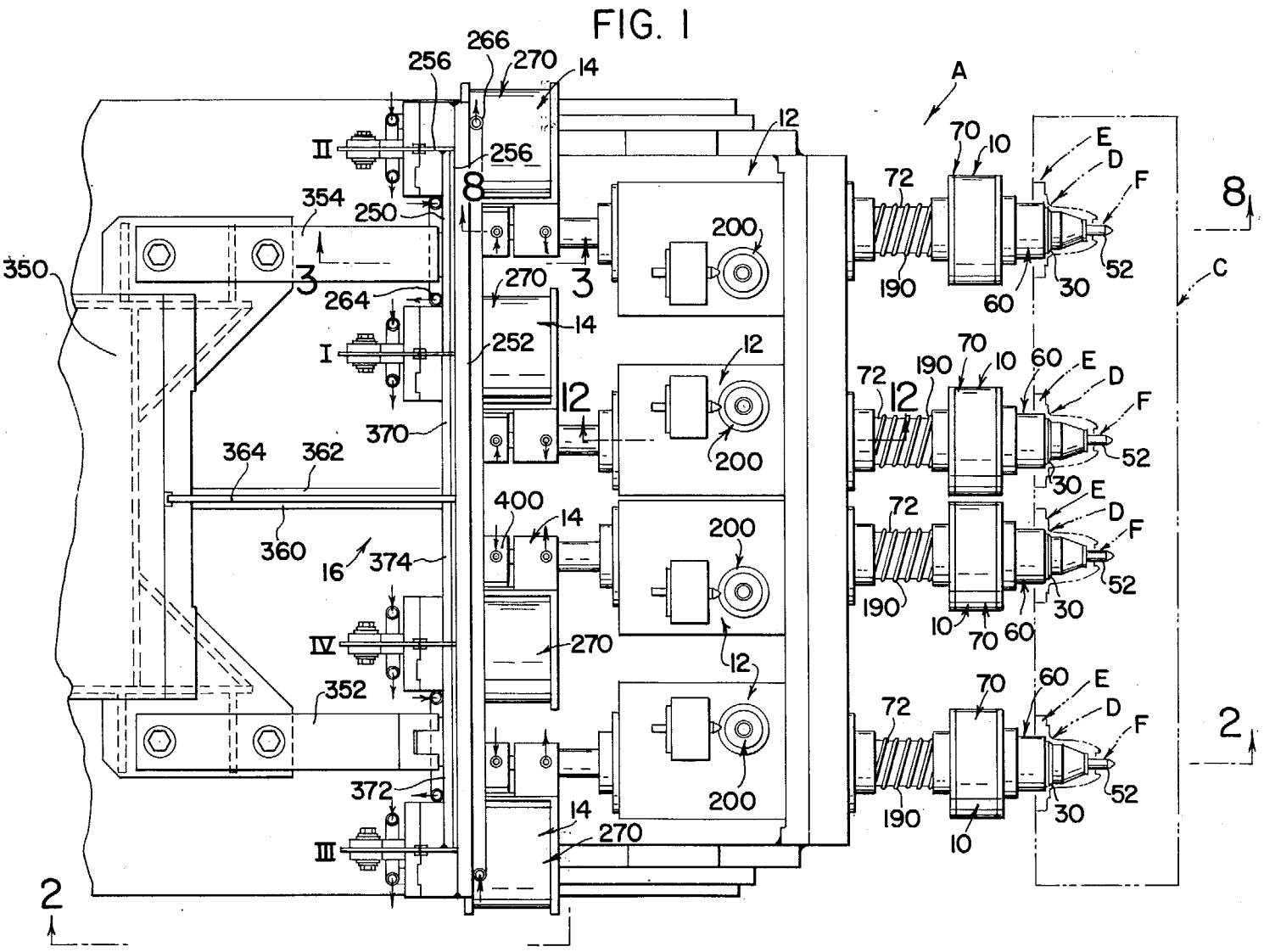
FIG. 1 is a top plan view illustrating the preferred embodiment of the present invention.
Figure 2:
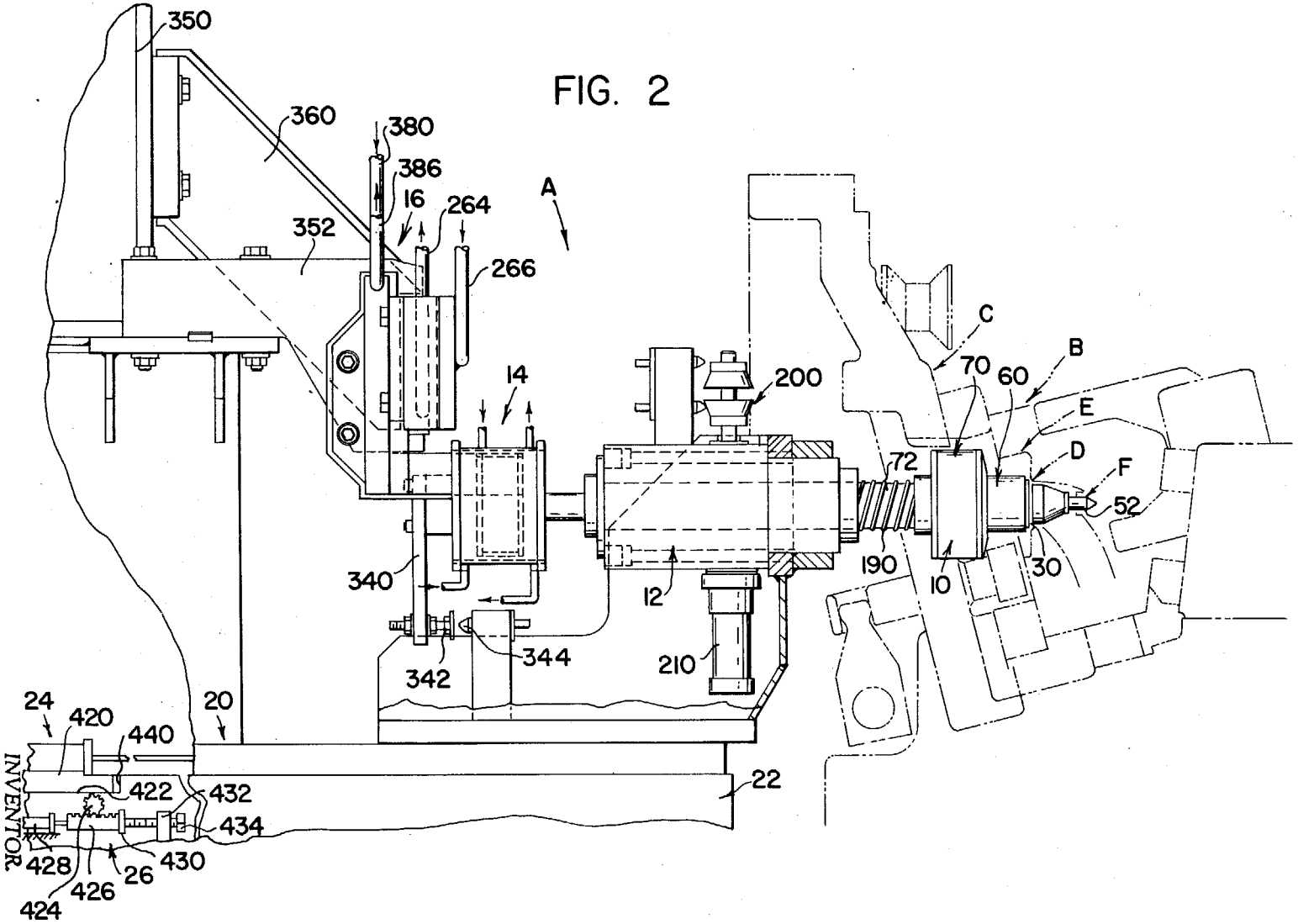
FIG. 2 is a side elevational view taken generally along line 2—2 of FIG. 1.

Referring now to the drawings wherein the showings are for the purpose of illustrating a preferred embodiment of the invention only and not for the purpose of limiting same, FIGS. 1 and 2 show an induction heating device A and an engine head B held in position with respect to the apparatus by appropriate clamping device C, which form no part of the present invention. The engine head includes a plurality of spaced valve seats D generally lying in a common plane and within recessed exhaust ports E. Concentric with the conical valve seats are a plurality of bores F which are adapted to receive the valve stems of a normal poppet valve. The apparatus A includes, as primary elements, an inductor, inductor carrier and inductor locator device 10, best shown in FIGS. 8–11 and hereinafter also referred to as the "inductor device"; an inductor support and locking device 12, best shown in FIGS. 13, 14; an inductor transformer 14, best shown in FIGS. 3–8; a power input system 16, best shown in FIGS. 1 and 2 and somewhat shown in FIGS. 3–7; a support frame 20 for carrying the above mentioned mechanisms; a platform 22 for reciprocally mounting support frame 20; a reciprocating mechanism 24, schematically represented as a double acting cylinder fixed onto the platform 22 and connected to the support frame for reciprocating the support frame with respect to the platform; and, back-off mechanism 26.

GENERAL OPERATION

Before describing the details of the apparatus A, an overall general description of the operation thereof will be benificial. In operation, the engine head B is positioned with the inductor devices 10 generally aligned with the respective conical valve seats D. Thereafter, the cylinder 24 moves the support frame 20 forward toward the engine head. During this forward movement, the respective inductors of the inductor devices 10 contact the valve seats D so that they are all positioned against the valve seats. To allow this action, each of the inductor devices 10 has a biasing arrangement to allow the device to stop when the inductor thereof contacts the valve seat as the support frame 20 continues forward movement. After all of the inductors are in the proper position with respect to the individual valve seats, the locking device 12 locks all of the inductor devices 10 in a fixed position with respect to the support frame 20. In this manner, all variations in the spacing of the valve seats and differences in radial locations thereof are compensated for by the movement of the devices 10. After the locking has been effected, backoff mechanism 26 moves the support frame 20 backwardly a distance corresponding to the desired coupling gap between the inductors and the valve seats. In practice this back-off distance is less than 0.060 inches and preferably in the general neighborhood of 0.045 inches which provides a gap of about 0.030 inches with the seat surface. After this back-off movement, all of the inductors are in the proper heating position. Thereafter, the inductors are energized and the valve seats are inductively heated for subsequent quenching by a vehicle or mechanism not forming a part of the present invention. It is also contemplated that the seats can be hardened by cooling caused by the mass of the material which requires about 5–7 seconds. Thereafter, the inductors can be again energized at a lower power level for a short time, such as 3–5 seconds for quenching before the head is removed. A variety of structures could be utilized for accomplishing the above mentioned operation; however, in accordance with the preferred embodiment of the present invention certain specific structures are contemplated. These structures will be hereinafter described in detail.

INDUCTOR, INDUCTOR CARRIER AND INDUCTOR LOCATOR DEVICE

Referring now more particularly to FIGS. 8–11, one of the inductor, inductor carrier and inductor locator devices 10, referred to as the inductor devices, is shown in detail. A generally circular, single turn inductor 30 includes connector leads 32, 34 electrically connected onto a hollow tube 36 and a hollow sleeve 38, respectively. Although the inductor is generally circular, it can be somewhat elliptical to provide uniform heating. The tube and sleeve are insulated by sleeves 40, 42. The basic connector leads for the inductor 30 are, thus, the concentric tube 36 and the hollow sleeve 38. At one end of device 10 there is provided an electrically insulated insert 50 which holds the inductor in place and also supports an outwardly extending tip 52 which includes a cylindrical shaft 54 that is dimensioned to coact with bore F of the engine head B. Consequently, as device 10 moves forward, the shaft 54 registers with bore F and shifts the inductor 30 radially into a concentric relationship with the valve seat D. This necessitates a mechanism for allowing movement of the inductor in a radial direction with respect to the valve seat; however, a tilting action must be minimized so that the magnetic coupling gap between the inductor and the valve seat will remain uniform around the total circumference of the valve seat. To accomplish this task, and in accordance with the present invention, there is provided an arrangement which will allow the inductor to have slight transverse movement, but a minimum or no tilting action.

In accordance with the preferred embodiment of the present invention, a mechanism for accomplishing this translation function for the inductor includes an inductor carrier 60 formed from an insulating material and secured onto the hollow sleeve 38. The carrier includes an outwardly extending flange 62 substantially parallel to the general plane of the valve seat D. Bearing rings 64, 66 are positioned on opposite facing surfaces of flange 62 to coact with a support frame 70 in a manner to be described.

Referring now to the support frame 70, this frame is mounted onto a rearwardly extending sleeve 72 which is, in turn, mounted for only reciprocal movement in a mechanism to be described later. Consequently, frame 70 is restrained from movement in a radial direction with respect to the valve seat D. Frame 70 includes a back plate 74, a cylindrical spacer sleeve 76 and a front, or face, plate 80. A plurality of circumferentially spaced clamping bolts 82 are provided for drawing the face plate toward the back plate. A seal 84 which has sufficient resiliency to allow movement of the carrier 60 is provided between the carrier and the face plate 80. Bearing rings 90, 92, similar to bearing rings 64, 66, are secured onto the back plate 74 and the face plate 80, respectively, to provide a bearing surface for ball cages 94, 96. These cages provide a series of rolling elements, such as balls, between the bearing ring. A plurality of rubber springs 98 are positioned between the cages and the spacer sleeve 76 to maintain the cages centered. A controlled amount of pressure is applied to the balls of the cages 94, 96 by the clamping bolts 82 so that movement of the flange 62 can only be in a direction substantially parallel to the general plane of the valve seat D.

Since it is advisable to center the carrier 60, and thus the inductor 30, during each cycle of the apparatus A, there is provided a centering means 110 which may take a variety of structural forms. In accordance with the preferred embodiment of the present invention, the centering means 110 includes a bore 112 in back plate 74 and adapted to receive a cam block 114 having a stem 116 within the bore 112 and an outwardly facing head 118 having a conical recess 120. Flange 62 is provided with a bore 130 generally coinciding with the bore 112 in the back plate 74. Within this bore there is provided a sleeve 132. A ball 134 supported on a carrier 136 is reciprocally mounted on the sleeve 132, and is biased toward the conical recess 120 by an appropriate spring 138. This arrangement assures that the carrier 60 is in a preselected position before being shifted by the bore F. In practice, two of the centering means 110 are provided on diametrically opposite portions of the device 10. Since the conical recess 120 has a limited active distance a, there is incorporated in the present embodiment an arrangement for limiting the amount of radial shift that can be made by the carrier 60. The limiting arrangement is the radial spacing b between flange 62 and spacer 76. Spacing b is no more than distance a which is the active distance of the centering means 110. A gap 152 is provided between sleeve 42 and sleeve 72. This gap has a dimension c which is slightly greater than spacing b so that the sleeve 42 does not contact sleeve 72 during normal operation of the device 10. To limit rotational movement of carrier 60, an element 140 includes a bore 142 within back plate 74 and adapted to receive a pin 144 which abuts retainer 146 and is held by a press fit. A bore 150 within the flange 62 is dimensioned to provide a spacing between the pin 144 and the surface of the bore equal to spacing b.

In summary, the inductor device 10 allows the inductor 30 to be positioned concentrically with respect to the valve seat D without any tilting movement and without actually causing any movement of the support frame 70 which has an additional function which will be described later and which is benefitted by the relative fixed position of the support frame 70 during radial movement of the inductor 30 for the purposes of concentricity.

INDUCTOR SUPPORT AND LOCKING DEVICE

Figure 12:
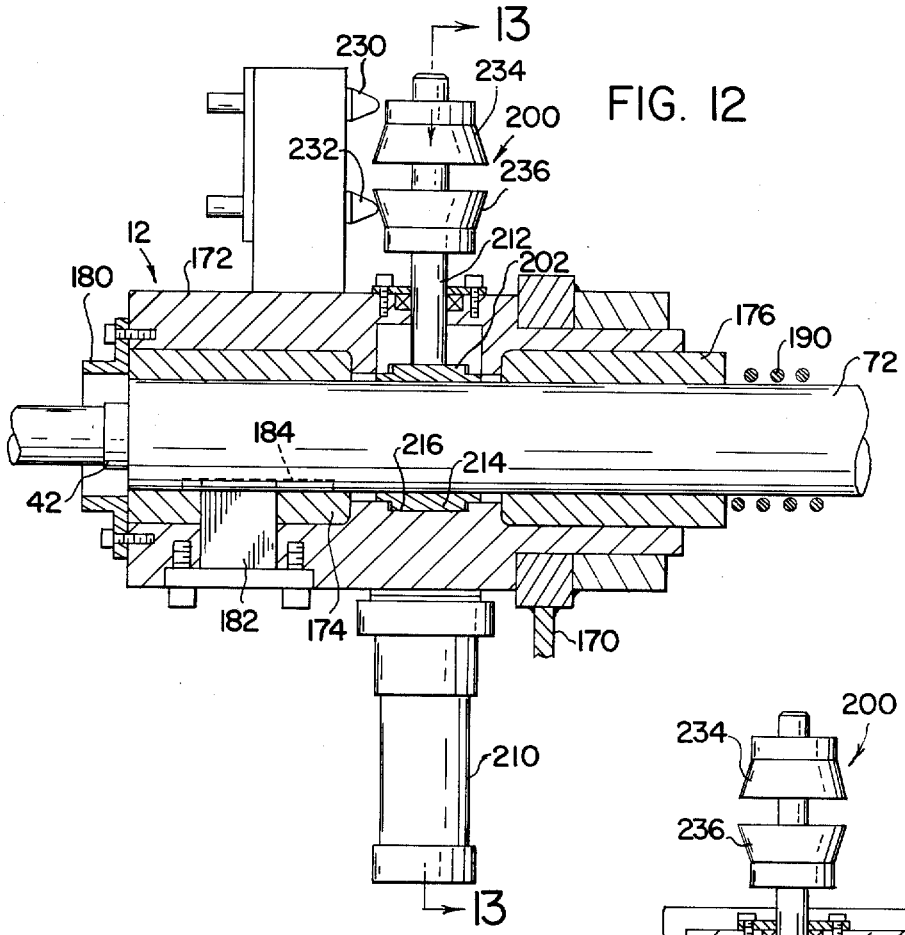
FIG. 12 is an enlarged cross-sectional view taken generally along line 12—12 of FIG. 1.
Figure 13:
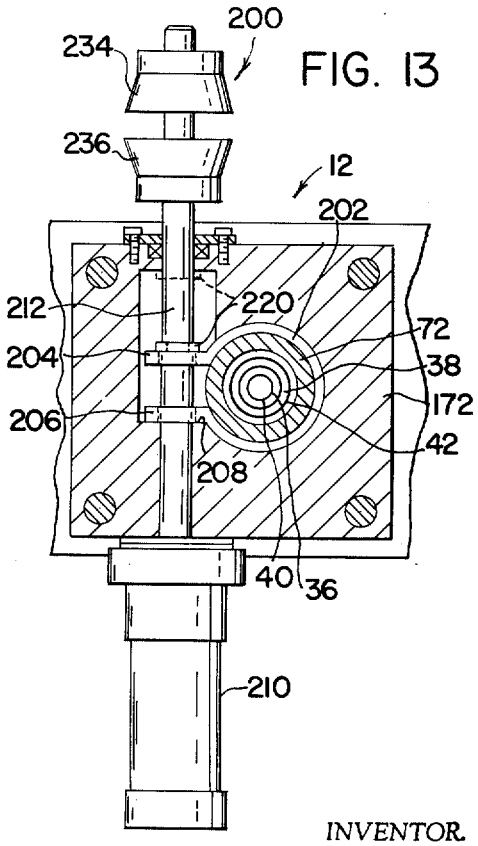
FIG. 13 is a cross-sectional view taken generally along line 13—13 of FIG. 12.
Figure 14:
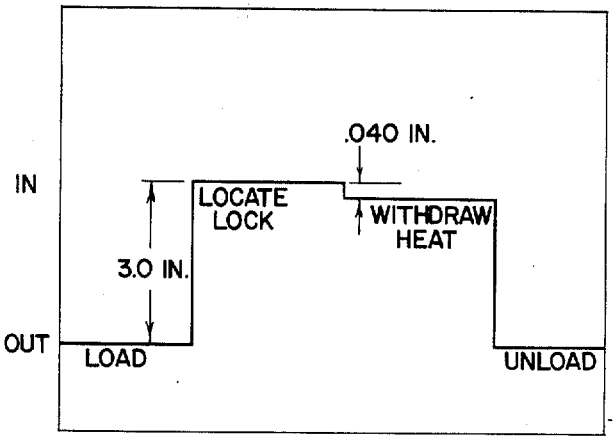
FIG. 14 is a graph illustrating schematically an operating characteristic of the present invention.

Referring now to FIGS. 12 and 13, the inductor support and locking device 12 provides for reciprocal movement of the device 10 supported on sleeve 72 and for locking inductor device 10 in a reciprocal position determined by the backward movement of the inductor device 10 as it contacts the engine head during forward movement of the support frame 20. A variety of structures could be used for accomplishing this purpose; however, one structure is schematically illustrated and includes a frame 170 for supporting a housing 172. Within the housing there are two axially aligned bearings or bushings 174, 176 which reciprocally support sleeve 72. A retainer 180 holds bushing 174 in position. To prevent rotation of the sleeve 72, there is provided a key 182 coacting with a keyway 184 in the sleeve. The key limits movement of the sleeve 72 in both directions. In accordance with the present invention, the inductor device 10 is biased forwardly toward the block. In accordance with the illustrated embodiment of the present invention this is accomplished by a spring 190 surrounding the sleeve 72 and creating a biasing action between bushing 176 and the back plate 74 of support frame 70. By this structure, reciprocal movement is allowed and a biasing action is created.

To lock the sleeve 72 in a selected position with respect to housing 172, there is provided a locking device 200 which includes a clamp ring 202 surrounding the sleeve 72 and having aligned ears 204, 206. The ear 206 coacts with a shoulder 208 during the locking operation. The locking action is effected by a cylinder 210 having a rod 212. Ring 202 has a ridge 214 that coacts with annular recess 216 to center and limit the opening of the ring by its own resiliency.

In operation, when the rod 212 is in the position shown in FIG. 13, the clamp ring 202 is pulled down by a sleeve 220 and locks the sleeve 72 with respect to housing 172. The operation of cylinder 210 shifts the rod 212 to an upward position so sleeve 220 contacts the upper side of the housing. The resiliency of ring 202 opens the ring and releases sleeve 72 for reciprocal movement. The ring is centered by recess 216 to prevent drag on the sleeve 72.

Above the housing 172 there are provided two spaced switches 230, 232 and actuators 234, 236 mounted onto the rod 212. These switches are used to indicate whether the locking device is in the locked or unlocked position. These switches are used in the electrical circuit for the machine which can take a variety of structural forms and is not a part of the present invention.

INDUCTOR TRANSFORMER AND RELATED STRUCTURE

Figure 5:
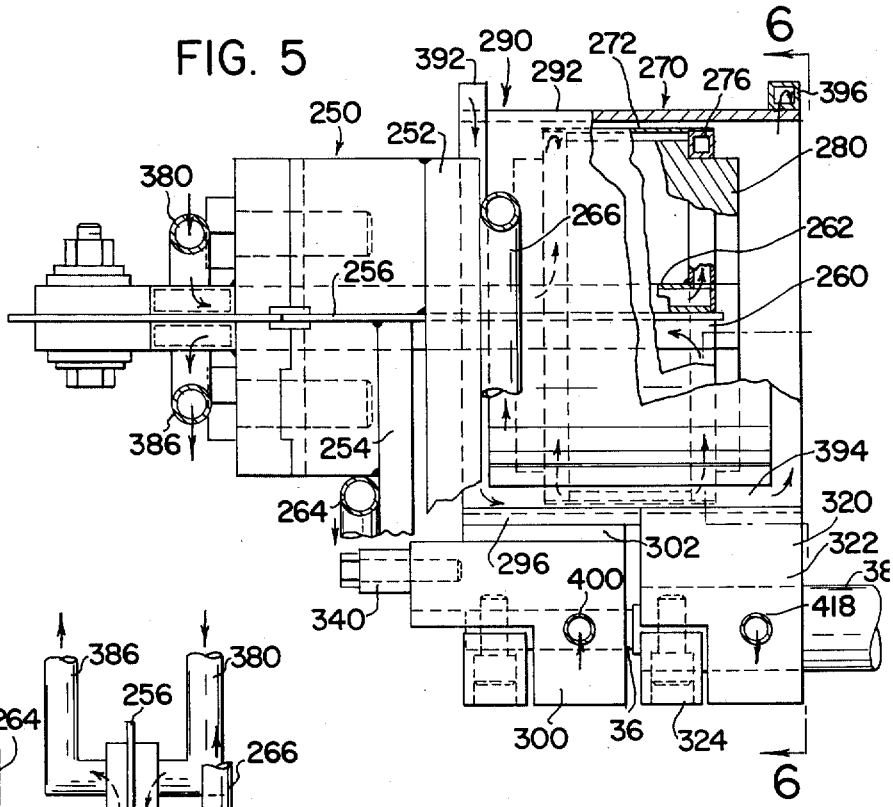
FIG. 5 is a top view taken generally along line 5—5 of FIG. 3.
Figure 6:
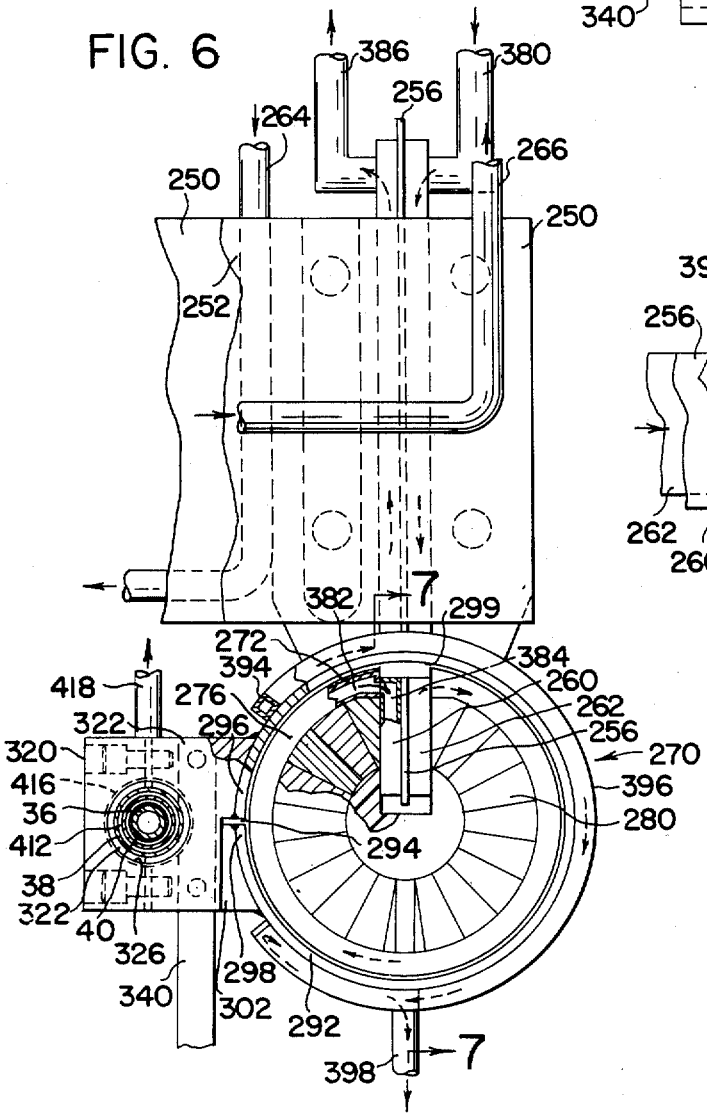
FIG. 6 is a partial view taken generally along line 6—6 of FIG. 5.
Figure 7:
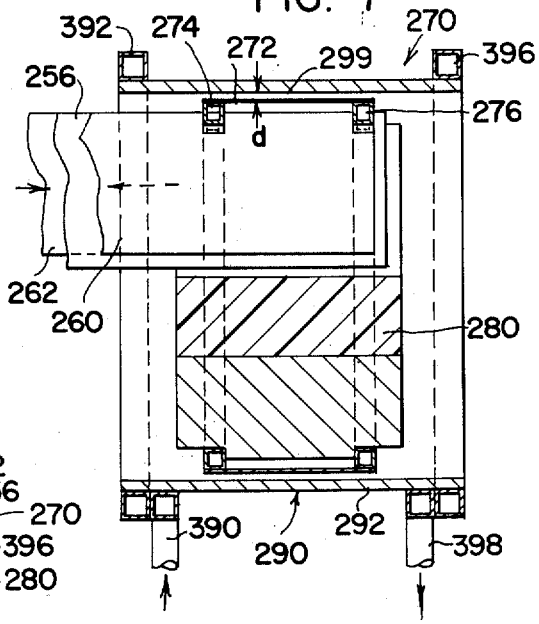
FIG. 7 is a cross-sectional view taken generally along line 7—7 of FIG. 6.

Referring now more particularly to FIGS. 3–8, the inductor transformer 14 and its related structure are illustrated. Basically, insulated bus bars 250, 252 are supported by an appropriate support structure 352, 354, which does not form a part of the invention, and separated by an insulation 256 are connected onto hollow, generally parallel input strips 260, 262. Coolant tubes 264, 266 are used to control the temperature of the bus bars. Hollow input strips 260, 262 are directed into the actual transformer 270 which is best shown in FIGS. 6 and 7. A single sheet primary 272 is connected between the strips 260, 262 and includes hollow conductors 274, 276. Within the primary winding 272 there are provided a series of normal flux concentrators 280. Transformer 270 includes a secondary 290 in the form of a single sheet 292 having an axially extending gap 294 and terminal ends 296, 298. There is a gap 299 between the primary sheet 272 and the secondary sheet 292. This gap has a spacing d, shown in FIG. 7, which is at least as great as the spacing b between flange 62 and spacer 76. Consequently, any radial movement of the inductor device 10 is allowed by the gap 299.

In accordance with the illustrated embodiment of the invention, the secondary 290 is cantilevered onto the inductor device 10 by being coupled directly onto and supported by the rearwardly extending tube 36 and hollow sleeve 38. The connection between the tube and sleeve and the secondary also forms the electrical connection to these elements for energizing the inductor 30. A variety of structure could be used for making this connection; however, in accordance with the illustrated embodiment of the present invention, end 298 of secondary 290 is coupled with tube 36 by a coupling device 300 best shown in FIGS. 4, 5 and 8. This coupling device includes a block 302 welded onto end 298 and a clamping plate 304 for clamping tube 36 against the block 302. Within the block there is a bore 306 having a larger diameter than the diameter of the tube 36 and provided with spaced seals 310, 312 for the coolant system to be described later.

Figure 8:
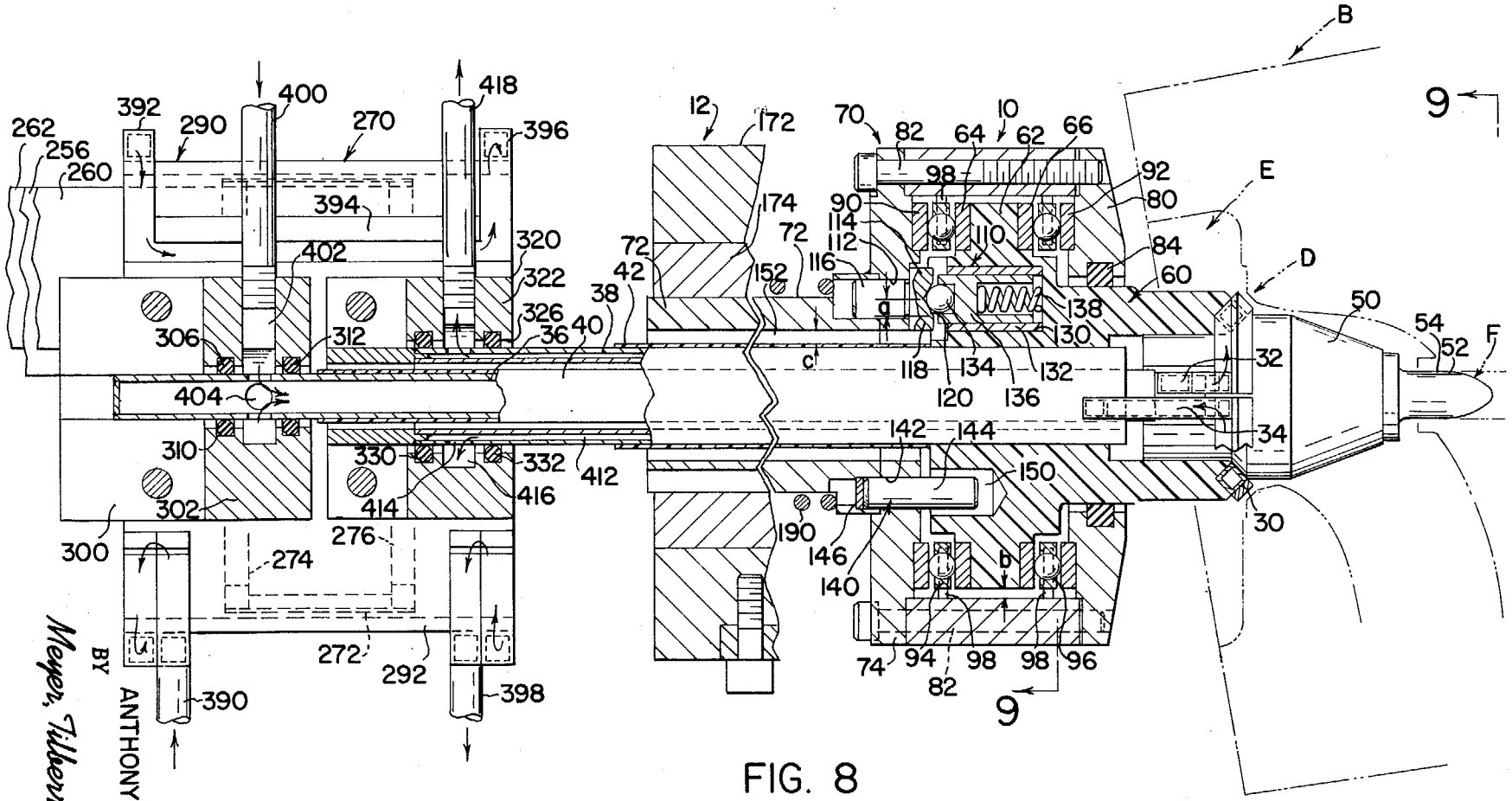
FIG. 8 is an enlarged partial cross-sectional view taken generally along line 8—8 of FIG. 1.
Figure 9:
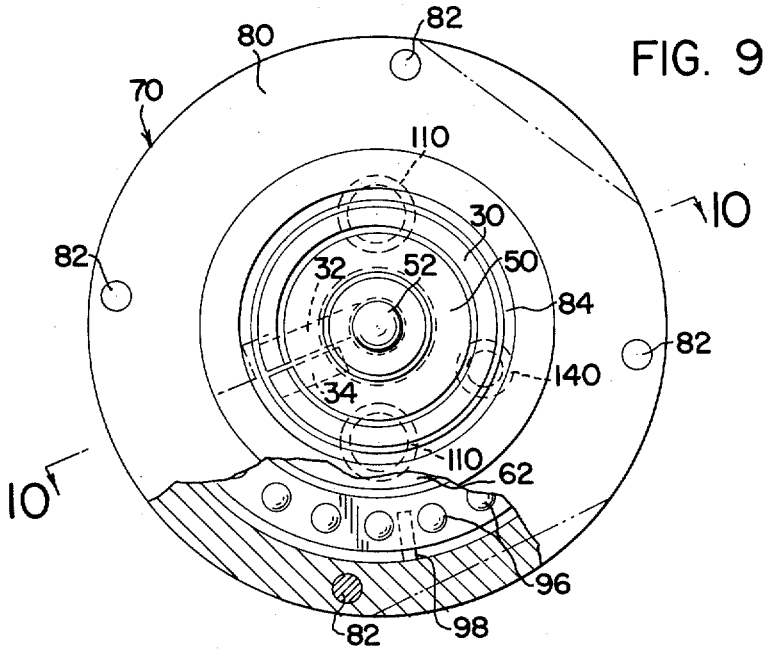
FIG. 9 is a partial cross-sectional view taken generally along line 9—9 of FIG. 8.

Secondary 290 is connected onto sleeve 38 at end 296 by a coupling device 320 best shown in FIGS. 5, 6 and 8. A block 322 is welded onto end 296, and a clamp plate 324 clamps the hollow sleeve 38 with respect to the block 322. Within the block there is provided a bore 326 having a diameter substantially greater than the diameter of the sleeve 38. Spaced seals 330, 332 are provided between the bore 326 and the sleeve 38 for a purpose to be described later.

In summary, the primary and secondary are both single sheets to provide a 1:1 ratio. This transformer is primarily utilized for providing a relatively fixed primary and a movable secondary which can be carried by the inductor itself and can move with respect to the primary as described. This allows for radial adjustment of the inductor with respect to the valve seat without requiring movement of the primary.

During forward movement of device 10, an arm 340 bolted onto the back of block 302 contacts an adjustable switch head 342 which contacts spring biased switch head 344 to indicate forward movement of carrier 22.

POWER SYSTEM

Although the power system does not form a part of the present invention, it will be described primarily in connection with FIGS. 1 and 2. A normal step-down transformer 350 is supported by and fastened onto frame 20. Output leads 360, 362 are separated by an insulation member 364 and are connected in series with bus bar sections 370, 250, 252, 372, and 374 which connect the inductor transformers 14 at positions I, II, III, and IV in series. The particular bus bar arrangement described in connection with the inductor transformer is the arrangement particularly used at position II; however, the remaining connections are essentially the same and are clearly evident from FIG. 1.

TRANSFORMER COOLANT SYSTEM

A variety of arrangements could be provided for cooling the transformer 270; however, in accordance with the illustrated embodiment of the present invention, the primary of the transformer is cooled by a coolant entering through an inlet 380 which directs the coolant through the hollow strip 262 into a pair of passages 382 extending through conductors 274, 276. From these passages, a coolant enters passage 384 of hollow strap 260 and then exits from an outlet 386. The secondary is cooled in a similar manner. Coolant enters through an inlet 390 and then flows around a circumferentially extending hollow conductor 392 to a hollow cross-over conductor 394. From there, the coolant again flows around the secondary sheet 292 in a hollow conductor 396 which directs the coolant to an outlet 398.

INDUCTOR COOLANT SYSTEM

Figure 10:
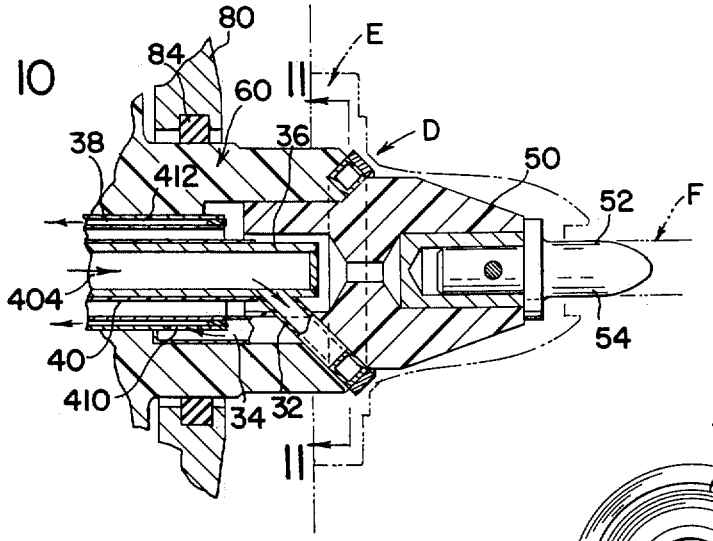
FIG. 10 is a cross-sectional view taken generally along line 10—10 of FIG. 9.
Figure 11:
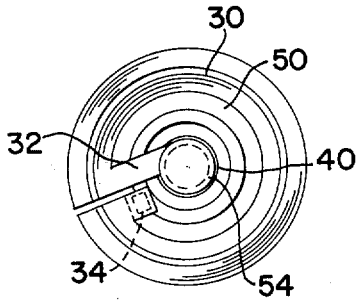
FIG. 11 is a cross-sectional view taken generally along line 11—11 of FIG. 10.

In accordance with the present invention, there is provided a system for cooling the inductor 30. This system, which is best illustrated in FIGS. 8 and 10, includes an inlet 400 for directing a coolant into a cavity 402 where it is communicated with bore 306 and then to ports 404 within tube 36. The coolant then flows through passage 406 within the tube 36 to lead 32, through this lead, through inductor 30, through lead 34 and then to port 410 in the hollow sleeve 38. Coolant then flows through the annular passage 412 to ports 414 which are in communication with a cavity 416. From the cavity 416, the coolant exits through an outlet 418.

FEEDING AND BACK-OFF MECHANISMS

As previously mentioned, cylinder 24 moves frame 20 forward to set the inductor devices with the inductors 30 in contact with the respective valve seats F. Thereafter the back-off mechanism 26 is actuated. This mechanism may take various structural embodiments; however, the illustrated embodiment includes a support slide 420 for supporting the cylinder 24 and reciprocated on surface 422. A pinion 424 is geared to the slide 420 and is rotated by a rack 426 operated by a cylinder 428. A stop 430 is used to limit movement of rack 426 and is adjustable with respect to block 432 by a bolt head 434. Consequently, when the frame 20 is being moved by cylinder 24 slide 420 is against a shoulder 440. After the inductor devices have been moved back and locked, cylinder 428 actuates rack 426 to shift slide 420 and cylinder 24 backwardly a distance controlled by stop 430. The inductors are now spaced from the valve seats for heating.

OPERATION OF THE METHOD AND APPARATUS

The operation of the method and apparatus has been disclosed in connection with the separate individual structures employed; therefore, only a recapitulation of the general method and apparatus is required. An engine head B is positioned as shown in FIGS. 1 and 2 and the locking devices 200 are released so that the inductor locator and support devices 10 are all biased outwardly by their springs 190. The outward movement is controlled by the key 182 at each station. Cylinder 24 then moves to the frame 20 a distance approximately 3 inches at which time tip 52 registers with bore F which shifts the carrier 60 within frame 70 in a lateral direction only to bring the inductor 30 into concentricity with the valve seat D at each station. Continued movement of the frame 20 brings the individual inductors 30 into contact with their respective valve seats. At that time, the frame 20 continues movement and devices 10 remain stationary. This changes the relative position of the devices 10 with respect to the support and locking device 12. After sufficient movement has been made to locate each of the inductors with respect to their valve seats, the forward movement of the frame is stopped. Then the cylinders 210 are actuated to clamp sleeve 72 with respect to frame 170 by ring 202. This compensates for any variation in the relative spacing between the respective valve seats. Cylinder 428 then moves the frame 20 away from the valve seats a distance corresponding to the desired gap between the valve seats and the inductors 30. Thereafter, frame 20 is stopped and the heating cycle is commenced. During lateral adjustment of the respective inductors, the secondary 290 moves within the primary 272 without contacting the same. This general operation cycle is illustrated in FIG. 15.

In practice the inductors are powered by an oscillator having a frequency between 290–450 Kc and each inductor is energized with about 10–12 kilowatts for about 6–9 seconds. The inductors are de-energized for about 5–7 seconds which allows the mass around the seat to cool the seat and cause hardening. Then, the inductors are again energized by the same oscillator at a power of about 5 kilowatts for about 3–5 seconds for tempering. This reduces stresses in the surfaces of the valve seats.

Having thus defined my invention, I claim:

1. A method of inductively heating the conical surface of a valve seat coaxially aligned with a bore in an engine component, said method comprising the following steps:

a. providing a single turn inductor having a shape generally matching said surface;
b. mounting said inductor for reciprocal movement with respect to a frame and in a direction generally parallel to the axis of said bore;
c. biasing said inductor in a direction toward said engine component;
d. moving said frame toward said engine component with said inductor generally aligned with said valve seat;
e. stopping the movement of said inductor at a preselected location while said frame continues to move toward said engine component;
f. thereafter stopping the movement of said frame toward said engine component;
g. then, locking said inductor with respect to said frame;
h. moving said frame and inductor away from said engine component a selected distance to provide proper spacing of said inductor from said surface; and,
i. energizing said inductor to thereby inductively heat said surface.

2. A method as defined in claim 1 wherein said selected distance is between about 0.015 – 0.050 inches.

3. A method as defined in claim 1 wherein said selected distance is approximately 0.040 inches.

4. A method as defined in claim 1 including the step of:

j. aligning said inductor in an axial direction with said valve seat as said frame is moving toward said engine component.

5. An induction heating device for heating the conical surface of a valve seat of an engine component preparatory to quench hardening, said engine component having a structural element fixed with respect to the center of said conical surface, said device comprising: a support frame fixed in a direction radial of said conical surface; an inductor having a shape generally matching said conical surface and two input leads for energizing said inductor; a carrier means for supporting said inductor; means for mounting said carrier means onto said support frame, said mounting means including means for limiting movement of said carrier means to only a direction radially of said conical surface; and, means on said carrier and adapted to coact with said structural element of said component for shifting to, and holding said carrier in, a position with said inductor generally concentric with said surface.

6. An induction heating device as defined in claim 5 including a first locator means on said frame and a second locator means on said carrier, said first and second locator means coacting to bias said carrier, and thus said inductor, into a preselected position with respect to said frame.

7. An induction heating device as defined in claim 6 wherein one of said locator means is a cam member and the other of said locator means is a follower member and means for biasing said members together in a direction generally axial of said conical surface.

8. An induction heating device as defined in claim 5 wherein said mounting means includes a flange on said carrier means, said flange lying in a plane generally perpendicular to the axis of said conical surface and said limiting means includes clamping means acting perpendicularly against said flange.

9. An induction heating device as defined in claim 8 wherein said clamping means includes a series of roller elements in contact with said flange and means for forcing said roller elements against said flange in a direction generally parallel to the axis of said conical surface.

10. An induction heating device as defined in claim 8 including a first locator means on said frame and a second locator means on said flange, said first and second locator means coacting to bias said flange, and thus said inductor, into a preselected position with respect to said frame.

11. An induction heating device as defined in claim 5 wherein said leads extend in a direction away from said conical surface, and including a transformer spaced from said frame, said transformer including a relatively fixed primary having a central opening with an axis generally parallel to the axis of said conical surface and a secondary within said opening, fixed onto said leads and movable with respect to said primary in a direction generally radial of said conical surface.

12. An induction heating device as defined in claim 11 including means for shifting said frame with respect to said fixed primary in a direction generally parallel to the axis of said conical surface and means for allowing said secondary to move within said opening in a direction generally parallel to said axis of said conical surface.

13. An induction heating device as defined in claim 12 including means for locking said frame with respect to said fixed primary during energization of said inductor.

14. An induction heating device as defined in claim 13 including means for selectively moving, in unison, said primary and said frame between a first position with said inductor spaced from said conical surface and a second position with said inductor adjacent said conical surface.

15. An induction heating device as defined in claim 5 including guide means for mounting said frame for reciprocal movement in a direction generally parallel to the axis of said conical surface.

16. An induction heating device as defined in claim 15 including means for selectively locking said frame with respect to said guide means.

*17. An induction heating device for heating the conical surface of a valve seat of an engine component preparatory to quench hardening, said engine component having a structural element fixed with respect to the center of said conical surface, said device comprising: an inductor having a shape generally matching said conical surface and two input leads for energizing said inductor; a carrier means for supporting said inductor; means for mounting said carrier means with respect to said valve seat, said mounting means including means for limiting radial movement of said carrier means to a selected direction for maintaining a uniform spacing between said valve seat surface and said inductor when said carrier means shifts radially of said valve seat into a concentric relationship with said valve seat surface; and means on said carrier to coact with said structural element of said component for shifting to, and holding said carrier in, a position with said inductor generally concentric with said surface, said movement limiting means being a flange on said carrier means, said flange lying in a plane generally perpendicular to the axis of said conical surface when said inductor is concentric with said valve seat surface.*

* * * * *